(12) United States Patent
Guo et al.

(10) Patent No.: US 8,473,888 B2
(45) Date of Patent: Jun. 25, 2013

(54) SYSTEMS AND METHODS OF DESIGNING INTEGRATED CIRCUITS

(75) Inventors: Ta-Pen Guo, Cupertino, CA (US);
Li-Chun Tien, Tainan (TW);
Shyue-Shyh Lin, Zhubei (TW);
Mei-Hui Huang, Cupertino, CA (US)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 176 days.

(21) Appl. No.: 13/047,419

(22) Filed: Mar. 14, 2011

(65) Prior Publication Data
US 2012/0240088 A1 Sep. 20, 2012

(51) Int. Cl.
*G06F 17/50* (2006.01)

(52) U.S. Cl.
USPC ........... 716/119; 716/100; 716/104; 716/110; 716/118

(58) Field of Classification Search
USPC .......................... 716/100, 104, 110, 118, 119
See application file for complete search history.

(56) References Cited

U.S. PATENT DOCUMENTS

| | | | |
|---|---|---|---|
| 5,097,297 A | 3/1992 | Nakazawa | |
| 5,616,940 A | 4/1997 | Kato et al. | |
| 5,637,899 A | 6/1997 | Eimori et al. | |
| 5,723,883 A | 3/1998 | Gheewalla | |
| 5,889,335 A * | 3/1999 | Kuroi et al. | 257/797 |
| 5,923,059 A | 7/1999 | Gheewala | |
| 6,411,543 B2 * | 6/2002 | Narui et al. | 365/149 |
| 6,922,823 B2 * | 7/2005 | Tester | 716/112 |
| 7,250,657 B2 | 7/2007 | Liaw | |
| 7,266,787 B2 * | 9/2007 | Hughes et al. | 257/374 |
| 7,343,570 B2 * | 3/2008 | Bowers et al. | 716/121 |
| 7,908,571 B2 * | 3/2011 | Bowers et al. | 716/132 |
| 8,225,255 B2 * | 7/2012 | Ouyang et al. | 716/110 |
| 2011/0291197 A1 * | 12/2011 | Wu et al. | 257/368 |
| 2012/0161217 A1 * | 6/2012 | Sato | 257/296 |

* cited by examiner

*Primary Examiner* — Sun Lin
(74) *Attorney, Agent, or Firm* — Lowe Hauptman Ham & Berner, LLP (57) ABSTRACT

A method of designing an integrated circuit includes defining at least one dummy layer covering at least one of a portion of a first metallic layer and a portion of a second metallic layer of an integrated circuit. The second metallic layer is disposed over the first metallic layer. The first metallic layer, the second metallic layer and a gate electrode of the integrated circuit have a same routing direction. A logical operation is performed to a file corresponding to the at least one of the portion of the first metallic layer and the portion of the second metallic layer covered by the dummy layer so as to size at least one of the portion of the first metallic layer and the portion of the second metallic layer.

20 Claims, 8 Drawing Sheets

SYSTEMS AND METHODS OF DESIGNING INTEGRATED CIRCUITS

CROSS-REFERENCES TO RELATED APPLICATIONS

The present application is a related to U.S. application Ser. No. 12/787,966, entitled "INTEGRATED CIRCUITS and MANUFACTURING METHODS THEREOF" filed on May 26, 2010, which is incorporated herein by reference.

TECHNICAL FIELD

The present disclosure relates generally to the field of semiconductor devices, and more particularly, to systems and methods of designing integrated circuits.

BACKGROUND

The semiconductor integrated circuit (IC) industry has experienced rapid growth. Technological advances in IC materials and design have produced generations of ICs where each generation has smaller and more complex circuits than the previous generation. However, these advances have increased the complexity of processing and manufacturing ICs and, for these advances to be realized, similar developments in IC processing and manufacturing are needed.

In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling-down also produces a relatively high power dissipation value, which may be addressed by using low power dissipation devices such as complementary metal-oxide-semiconductor (CMOS) devices.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the numbers and dimensions of the various features may be arbitrarily increased or reduced for clarity of discussion.

DETAILED DESCRIPTION

For CMOS devices, contact plugs are generally used for electrical connections between source/drain (S/D) regions and metal layers M1 of transistors. Generally, the contact plugs are disposed in contact holes that are formed in an inter-level dielectric (ILD) layer. The contact holes marked on a mask layer are square. The square patterns on the mask layer are transferred on the ILD layer and become rounded. The contact plugs thus have a substantially round shape from a top view that is orthogonal to a surface of a wafer on which the transistors are formed. It is found that if the geometry of the CMOS devices scales down, the S/D resistances of the transistors increase. The increased S/D resistances compromise electrical performances, e.g., operation current, speed, frequency, etc, of the transistors or circuits.

It is understood that the following descriptions provide many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "below," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

Figure 1:
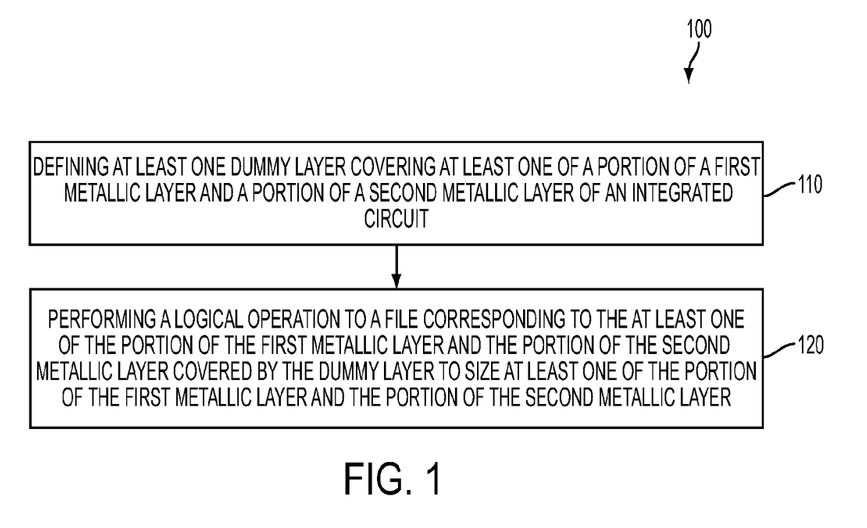
FIG. 1 is a flowchart of a first exemplary method of designing an integrated circuit.

FIG. 1 is a flowchart of an exemplary method of designing an integrated circuit. It is understood that FIG. 1 has been simplified for a better understanding of the concepts of the present disclosure. Accordingly, it should be noted that additional processes may be provided before, during, and after the method of FIG. 1, and that some other processes may only be briefly described herein.

Referring to FIG. 1, a method 100 of designing an integrated circuit can include defining at least one dummy layer covering at least one of a portion of a first metallic layer and a portion of a second metallic layer of an integrated circuit (block 110). The second metallic layer can be disposed over the first metallic layer. The first metallic layer, the second metallic layer and a gate electrode of the integrated circuit can have a same routing direction. The method 100 can also include performing a logical operation to a file corresponding to the at least one of the portion of the first metallic layer and the portion of the second metallic layer covered by the dummy layer so as to size at least one of the portion of the first metallic layer and the portion of the second metallic layer (block 120).

Figure 2A:
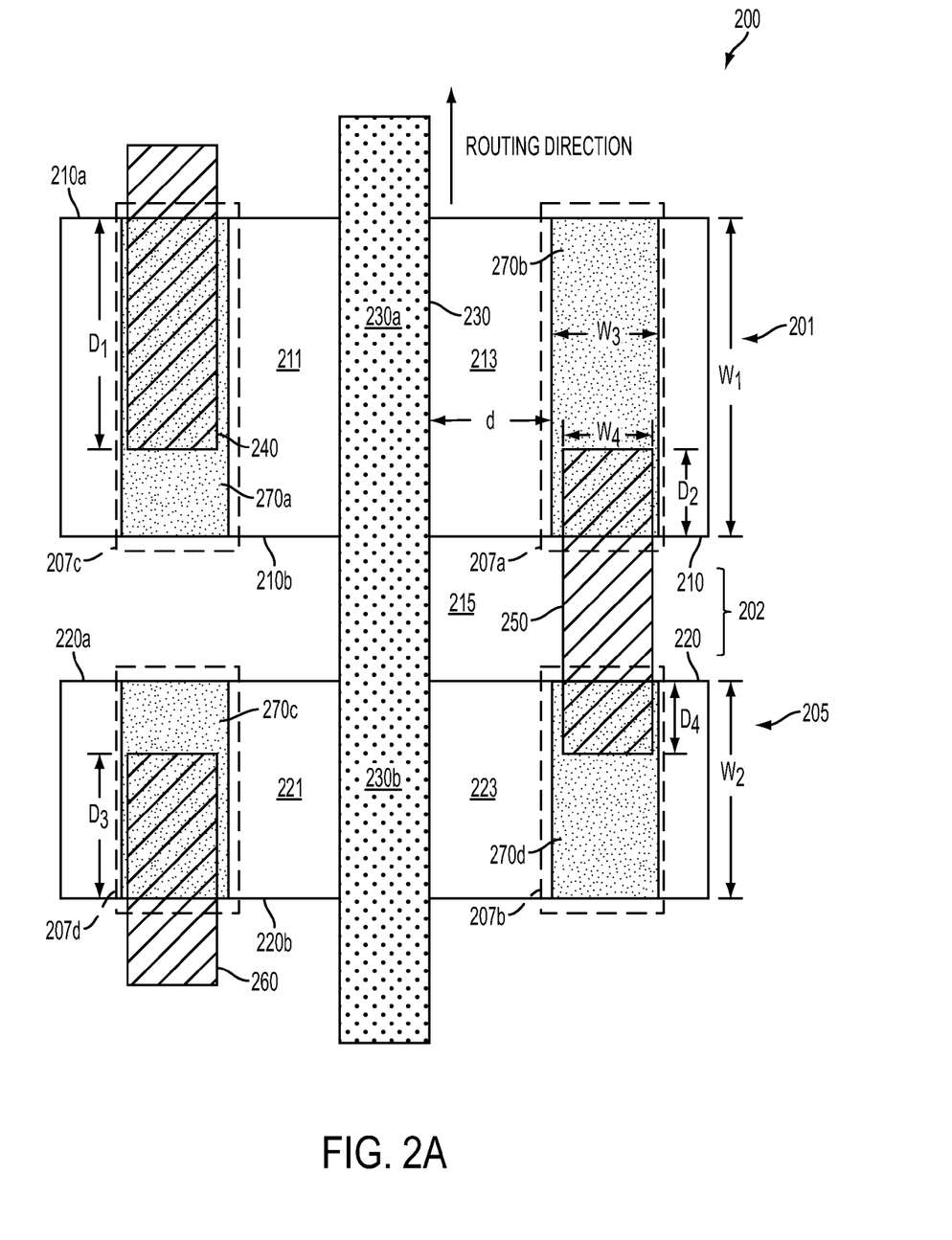
FIG. 2A is a schematic drawing illustrating exemplary layout layers of an exemplary integrated circuit with a first exemplary dummy layer.

In some embodiments, an integrated circuit 200 can include exemplary layout layers as shown in FIG. 2A. It is noted that the exemplary drawing shown in FIG. 2A merely depicts overlaps of a diffusion layer, a gate electrode layer and metallic layers. In FIG. 2A, an integrated circuit 200 can include a P-type transistor 201 that is electrically coupled with an N-type transistor 205. In some embodiments, the integrated circuit 200 can be a digital circuit, an analog circuit, a mixed-signal circuit, a static random access memory (SRAM) circuit, an embedded SRAM circuit, a dynamic random access memory (DRAM) circuit, an embedded DRAM circuit, a non-volatile memory circuit, e.g., FLASH, EPROM, E²PROME, a field-programmable gate circuit, or any combinations thereof. In other embodiments, the P-type transistor 201 and the N-type transistor 205 can be deployed in an inverter, a logic gate circuit, an amplifier, a charge pump circuit, or any circuit that has a CMOS device.

Referring to FIG. 2A, the integrated circuit 200 can include at least one diffusion area, e.g., a diffusion area 202. The diffusion area 202 can include at least one diffusion region, e.g., diffusion regions 210 and 220. The diffusion region 210 can include a source region 211 and a drain region 213 of the P-type transistor 201. The diffusion region 220 can include a source region 221 and a drain region 223 of the N-type transistor 205. The diffusion region 210 can be separated from the diffusion region 220 by an isolation structure 215. The isolation structure 215 can include a shallow trench isolation (STI) structure and/or a local oxidation of silicon (LOCOS) structure. In some embodiments, widths $W_1$ and $W_2$ of the diffusion regions 210 and 220, respectively, are different. In other embodiments, the width $W_1$ of the diffusion region 210 is larger than the width $W_2$ of the diffusion region 220.

Referring to FIG. 2A, a gate electrode 230 can continuously extend across the diffusion regions 210 and 220 in a routing direction of the gate electrode 230. In some embodiments, the gate electrode 230 can include gate electrode portions 230a and 230b for the P-type transistor 201 and the N-type transistor 205, respectively. The gate electrode portions 230a and 230b can be configured to receive voltages, controlling the turning on or off of the P-type transistor 201 and the N-type transistor 205, respectively. It is noted that the routing direction shown in FIG. 2A is merely exemplary. In other embodiments, the routing direction can be in the horizontal direction or any direction that tilts with respect to the horizontal direction.

Referring again to FIG. 2A, the integrated circuit 200 can include at least one metallic layer, e.g., metallic layers 270a-270d, each directly contacting one of source regions 211, 221 and drain regions 213, 223. In some embodiments, metallic layers 240, 250 and 260 can be disposed over the metallic layers 270a, 270b and 270c, respectively. The metallic layers 240, 250 and 260 can be electrically coupled with the source region 211, the drain region 213 and source region 221 through the metallic layers 270a, 270b and 270c, respectively. In some embodiments, the metallic layers 270a-270d can at least partially overlap respective metallic layers 240, 250, and 260 in the routing direction.

In some embodiments, the width of each of the metallic layers 270a-270d can be substantially equal the respective metallic layers 240, 250, and 260. In other embodiments, the metallic layers 270a-270d can be wider than the respective metallic layers 240, 250, and 260. For example, the metallic layer 270b can have a width $W_3$ and the metallic layer 250 can have a width $W_4$ as shown in FIG. 2A. The width $W_3$ is larger than the width $W_4$. In some embodiments, the metallic layers 270a-270d can be referred to as M0 OD-1 metal layers and the metallic layers 240, 250, and 260 can be referred to as M0 OD-2 metal layers.

In some embodiments, the metallic layers 270a-270d can each continuously extend from an edge 210a to an opposite edge 210b of the diffusion region 210 or an edge 220a to an opposite edge 220b of the diffusion region 220. In other embodiments, the metallic layers 270a-270b can each extend over or shorten from the edges 210a-210b by a distance that is about 5% of a width $W_1$ of the diffusion region 210 or less. In still other embodiments, the metallic layers 270c-270d can each extend over or shorten from the edges 220a-220b by a distance that is about 5% of a width $W_2$ of the diffusion region 220 or less.

In some embodiments, the metallic layer 240 and the diffusion region 210 can overlap with a distance $D_1$ in the routing direction. The metallic layer 250 and the diffusion region 210 can overlap with a distance $D_2$ in the routing direction. In some embodiments, the distance $D_1$ can be larger than the distance $D_2$. The metallic layer 260 and the diffusion region 220 can overlap with a distance $D_3$ in the routing direction. The metallic layer 250 and the diffusion region 220 can overlap with a distance $D_4$ in the routing direction. In some embodiments, the distance $D_3$ can be larger than the distance $D_4$. In other embodiments, the distance $D_3$ can be larger than the distance $D_2$.

It is noted that the structure shown in FIG. 2A is merely exemplary. In some embodiments, a sum of the distances $D_1$ and $D_2$ can be substantially equal to the width $W_1$. In other embodiments, a sum of the distances $D_1$ and $D_2$ can be larger or smaller than the width $W_1$. In still other embodiments, a sum of the distances $D_3$ and $D_4$ can be substantially equal to the width $W_2$. In yet still other embodiments, a sum of the distances $D_3$ and $D_4$ can be larger or smaller than the width $W_2$. It is also noted that the term "a metallic layer" here can mean a metallic line, a metallic wire, a metallic rope, a metallic string, a metallic block, a metallic bar, a metallic pad, a metallic slat, or any other metallic structures that continuously extend for a predetermined distance.

In some embodiments, a ratio of the distance $D_1$ to the width $W_1$ can range from about 0.75:1 to about 1:1, and a ratio of the distance $D_2$ to the width $W_1$ can range from about 0.1:1 to about 0.33:1. In other embodiments, a ratio of the distance $D_3$ to the width $W_2$ can range from about 0.75:1 to about 1:1, and a ratio of the distance $D_4$ to the width $W_2$ can range from about 0.1:1 to about 0.33:1.

It is noted that the metallic layers 240, 250 and 260 can each at least partially continuously extend over the diffusion regions 210 and/or 220 for electrically coupling the respective source and drain regions. With the at least partially continuously extending structures, the source/drain (S/D) resistances of the transistors can be reduced.

In some embodiments, the metallic layer 250 does not continuously extend from an edge 210a to an opposite edge 210b of the diffusion region 210 and an edge 220a to an opposite edge 220b of the diffusion region 220. The metallic layer 250 does not fully cover the diffusion regions 210 and 220 in the routing direction. With the structures, parasitic capacitances between the gate electrode portion 230 to each of the metallic layers 240, 250 and 260, and/or parasitic capacitances among the metallic layers 240, 250 and 260 can be reduced. By modifying the resistances and/or the parasitic capacitances, the electrical characteristics, e.g., operation speed, operation frequency, etc, of the integrated circuit 200 can be desirably achieved.

Referring to FIGS. 1 and 2A, the block 110 can include defining at least one dummy layer, e.g., dummy layers 207a-207d, covering at least one of a portion of a first metallic layer and a portion of a second metallic layer of an integrated circuit. For example, the dummy layers 207a can cover the metallic layer 270a and a portion of the metallic layer 240. In some embodiments, the dummy layer 207a can also cover a portion (not labeled) of the diffusion region 210 of the integrated circuit 200.

Figure 2B:
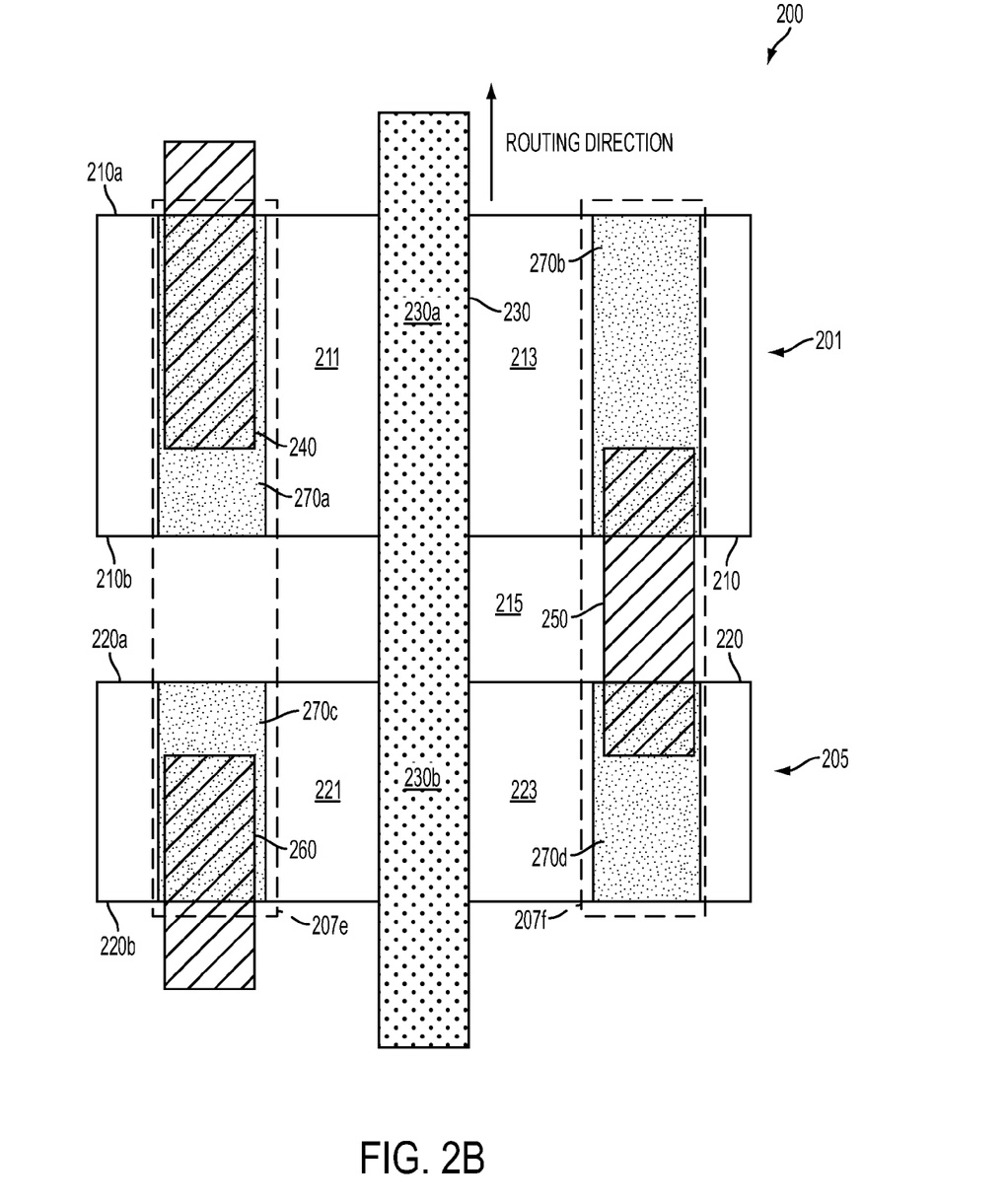
FIG. 2B is a schematic drawing illustrating exemplary layout layers of an exemplary integrated circuit with a second exemplary dummy layer.

In some embodiments, the at least one dummy layer can each cover portions of metallic layers and diffusion areas. For example, dummy layers 207e and 207f can each continuously extend from the edge 210a to the edge 220b as shown in FIG. 2B. The dummy layer 207e can cover potion of the metallic layers 240 and 260, the metallic layers 270a and 270c and portions of the diffusion regions 211 and 221 as shown in FIG. 2B. The dummy layer 207f can cover the metallic layer 250, the metallic layers 270b and 270d and portions of the diffusion regions 211 and 221 as shown in FIG. 2B.

In other embodiments, the at least one dummy layer can cover portions of metallic layers, portions of diffusion regions and a portion of a gate electrode. For example, a dummy layer 207g can cover potions of the metallic layers 240 and 260, the metallic layer 250, the metallic layers 270a-270d, the diffusion regions 210 and 220 and a portion of the gate electrode 230 as shown in FIG. 2C.

Figure 2C:
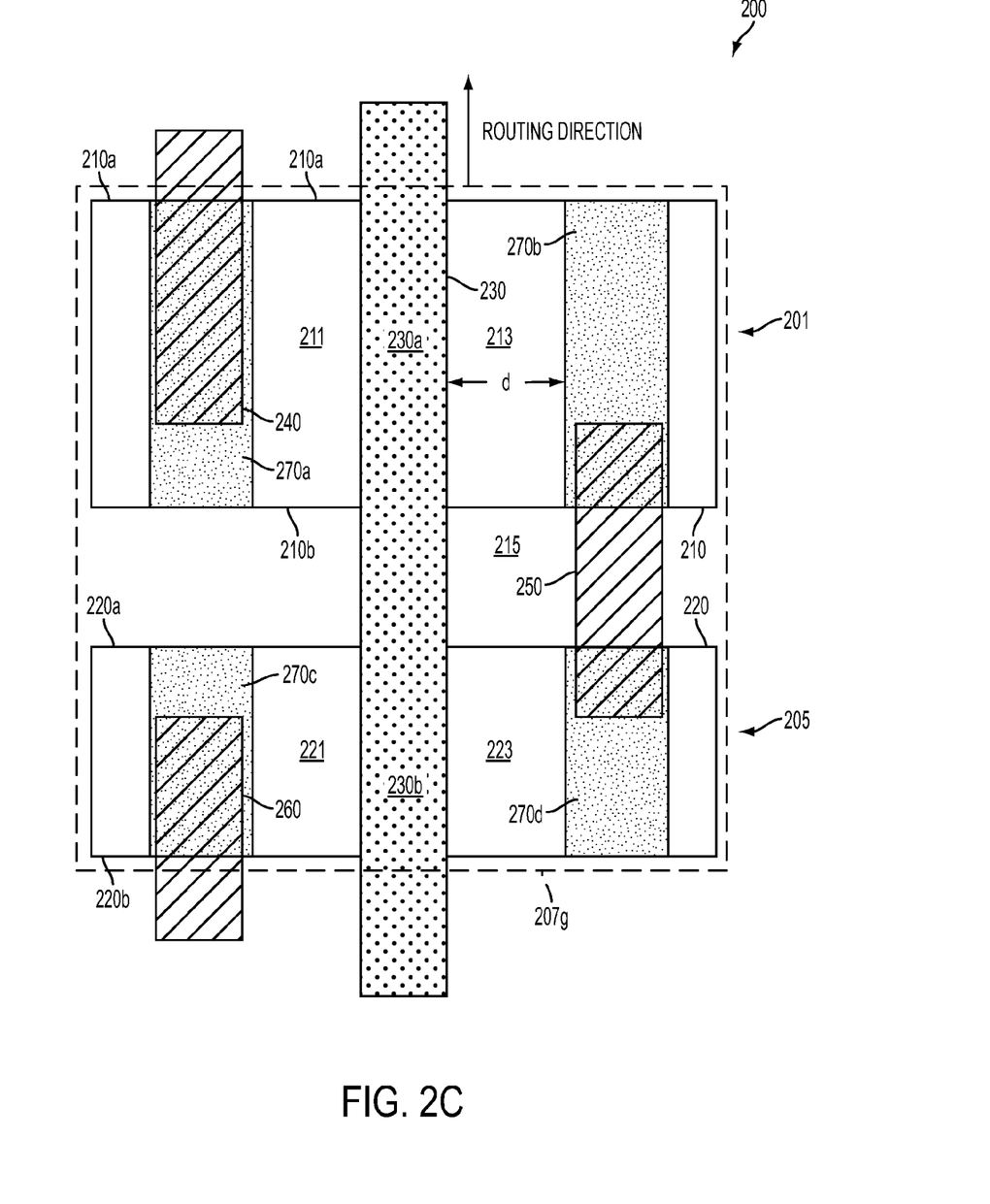
FIG. 2C is a schematic drawing illustrating exemplary layout layers of an exemplary integrated circuit with a third exemplary dummy layer.

It is noted that the illustrations shown in FIGS. 2A-2C are merely exemplary. The scope of this application is not limited thereto. For example, the dummy layer 207a shown in FIG. 2A can horizontally extend and cover the whole diffusion region 210. The horizontally-extended dummy layer 207a can also cover portions of the metallic layers 240-250, the metallic layers 270a-270b and a portion of the gate electrode 230. Similarly, the horizontally-extended dummy layer 207b can cover portions of the metallic layers 250-260, the metallic layers 270c-270d, a portion of the gate electrode 230, and the diffusion region 220.

Figure 2D:
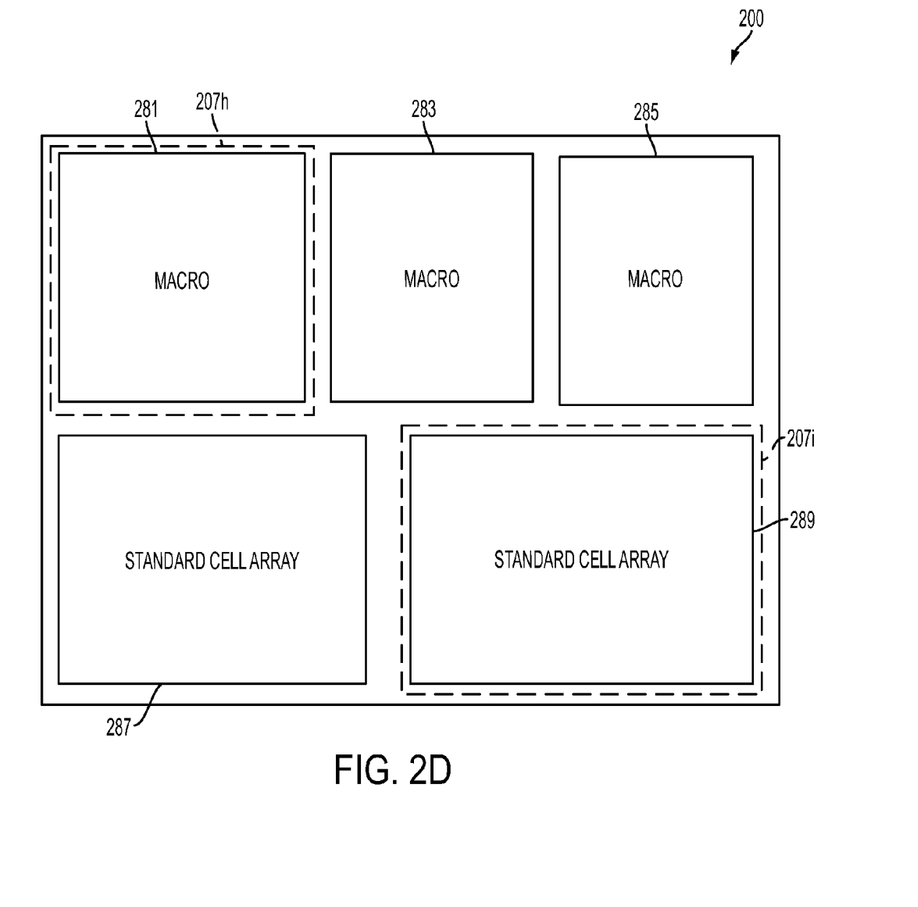
FIG. 2D is a schematic drawing illustrating an exemplary integrated circuit with a fourth exemplary dummy layer.

In still other embodiments, the integrated circuit 200 can include at least one of a macro, a micro, a building block and a standard cell array. For example, the integrated circuit 200 can include macros 281, 283 and 285 and standard cell arrays 287 and 289 as shown in FIG. 2D. The macro 281 and the standard cell array 289 can each include the diffusion layer, the gate electrode and at least one metallic layer that are to be modified as described above in conjunction with FIGS. 2A-2C. Dummy layers 207h and 207i can cover the macro 281 and the standard cell array 289, respectively.

It is noted that the dummy layers 207a-207i described above in conjunction with FIGS. 2A-2D are used to define an area covering at least portions of the metallic layers 240, 250, 260 and 270a-270d, the diffusion regions 210 and 220, and/or the gate electrode 230. The covered portions of the metallic layers 240, 250, 260 and 270a-270d, the diffusion regions 210 and 220, and/or the gate electrode 230 can be subjected to a logic operation (described below) so as to size up or down dimensional parameters thereof. The sizing-up and/or sizing-down of the metallic layers 240, 250, 260 and 270a-270d, the diffusion regions 210 and 220, and/or the gate electrode 230 can increase and/or decrease resistances and/or capacitances of the integrated circuit 200. By modifying the resistances and/or capacitances of the integrated circuit 200, a desired resistance-capacitance (RC) time delay can be achieved.

Referring again to FIG. 1, the method 100 can include performing a logical operation to a file corresponding to the at least one of the portion of the first metallic layer and the portion of the second metallic layer covered by the dummy layer so as to size at least one of the portion of the first metallic layer and the portion of the second metallic layer (block 120). In some embodiments, the method 100 can include converting a layout database to a graphic data system (GDS) file. The conversion step can be performed before or after the logic operation.

Figure 3:
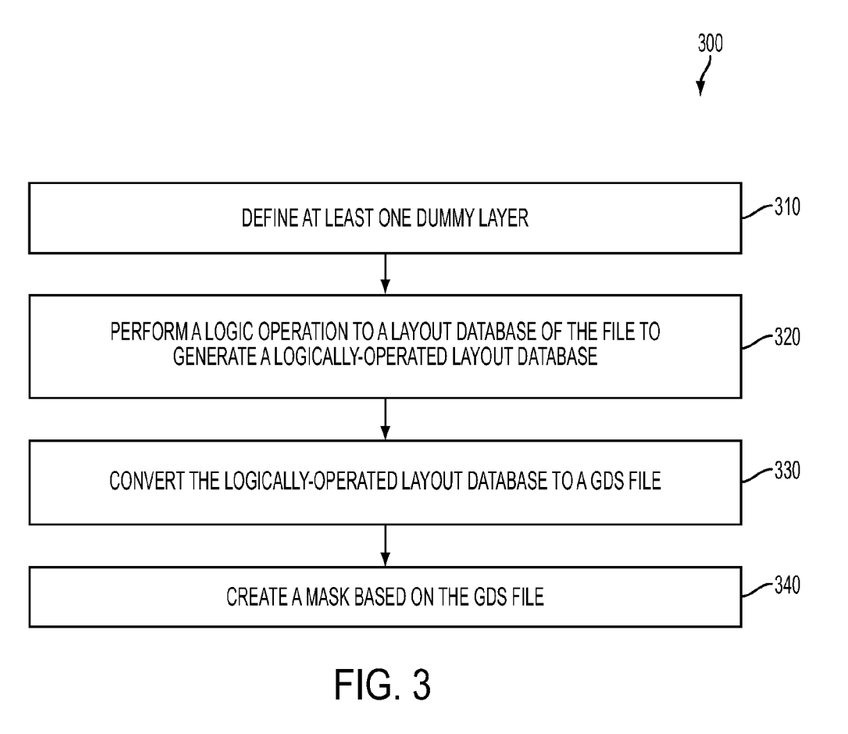
FIG. 3 is a flowchart of a second exemplary method of designing an integrated circuit.

For example, after defining at least one dummy layer (block 310) a method 300 of designing an integrated circuit can include performing a logic operation to a layout database of the file to generate a logically-operated layout database (block 320) as shown in FIG. 3. The block 310 can be as same as or similar to the block 110 described above in conjunction with FIG. 1. In the block 320, the layout database can include the area covered by the at least one dummy layer. In some embodiments, the layout database can be stored as a format that can be processed by VIRTUOSO® Layout Editor, or VIRTUOSO® XL-Layout Editor commercially available from Cadence Design Systems of San Jose, Calif. U.S.A., or LAKER™ commercially available from Springsoft Inc. of Taiwan.

In some embodiments, the logic operation of the block 320 can size up and/or down at least one of the portion of the first metallic layer and the portion of the second metallic layer that are covered by the at least one dummy layer. For example, the dummy layer 207a covers a portions of the metallic layer 250 and the metallic layer 270b as shown in FIG. 2A. To modify the capacitance and/or resistance of the integrated circuit 200, the logic operation can size up and/or down the parameters of the metallic layers 250 and/or 270.

For example, the logic operation can size up the width $W_3$ of the metallic layer 270b. In some embodiments, the width $W_3$ of the metallic layer 270b can be sized up, extending toward the gate electrode 230, such that the resistance of the metallic layer 270b is reduced. Additionally, a dimension d (shown in FIG. 2A) of a region (not labeled) that is between the gate electrode 230 and the metallic layer 270b is reduced. The resistance of the region between the gate electrode 230 and the metallic layer 270b is also reduced. The capacitance between the sized-up metallic layer 270b and the metallic layer 250 may be increased.

By using the at least one dummy layer to define the area that is to be sized up or down, the logic operation can automatically perform the dimensional parameter changes to the defined area without manually changing the defined area. The design of integrated circuits can be achieved easily and conveniently.

In some embodiments, the logic operation of the block 320 can further size up and/or down at least one of the portion of the gate electrode and the portion of the diffusion area that are covered by the at least one dummy layer. For example, the dummy layer 207g covers portions of the metallic layers 240 and 260, the metallic layer 250, the metallic layers 270a-270d, a portion of the gate electrode 230 and the diffusion regions 210-220 as shown in FIG. 2C. In addition, to modify the dimensional parameters of at least one of the metallic layers 240 and 260, the metallic layer 250 and the metallic layers 270a-270d, the logic operation may also modify the dimensional parameters of at least one of the gate electrode 230 and the diffusion regions 210-220.

For example, the logic operation can size up the width of the gate electrode 230. In some embodiments, the width of the metallic layer 230 can be sized up, extending toward the metallic layer 270b, such that the dimension d (shown in FIG. 2C) of the region (not labeled) that is between the gate electrode 230 and the metallic layer 270b is reduced. The resistance of the region between the gate electrode 230 and the metallic layer 270b is also reduced. To modify the capacitance and/or resistance of the integrated circuit 200, the logic operation can size up and/or down the parameters of the metallic layers 240, 250, 260 and 270a-270d, the gate electrode 230 and/or the diffusion areas 210-220.

After the logic operation, the sized layout design can be saved as a logically-operated layout database. The method 300 can include converting the logically-operated layout database to a GDS file (block 330). Then, the method 300 can include creating a mask based on the GDS file (block 340). It is understood that FIG. 3 has been simplified for a better understanding of the concepts of the present disclosure. Accordingly, it should be noted that additional processes may be provided before, during, and after the method of FIG. 3, and that some other processes may only be briefly described herein.

Figure 4:
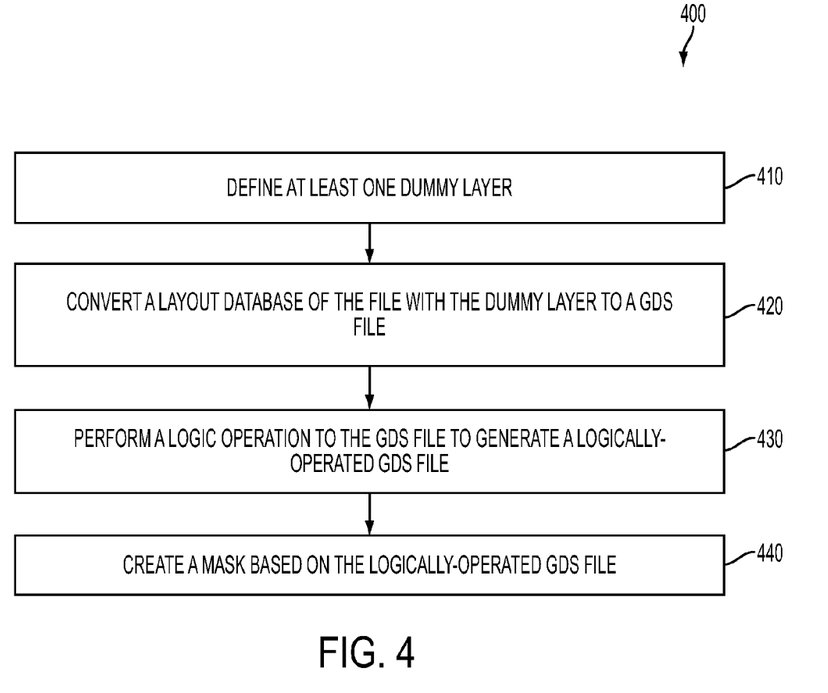
FIG. 4 is a flowchart of a third exemplary method of designing an integrated circuit.

In some embodiments, the conversion step can be performed before the logic operation. For example, after defining at least one dummy layer (block 410) a method 400 of designing an integrated circuit can include converting a layout database of the file with the dummy layer to a GDS file (block 420) as shown in FIG. 4. The block 410 can be as same as or similar to the block 110 described above in conjunction with FIG. 1.

After the conversion step of the block 420, the method 400 can include performing a logic operation to the GDS file to generate a logically-operated GDS file (block 430). The logic operation of the block 430 can be similar to the logic operation of the block 320 described above in conjunction with FIG. 3. After the logic operation, the method 400 can creating a mask based on the logically-operated GDS file (block 440). It is understood that FIG. 4 has been simplified for a better understanding of the concepts of the present disclosure. Accordingly, it should be noted that additional processes may be provided before, during, and after the method of FIG. 4, and that some other processes may only be briefly described herein.

Figure 5:
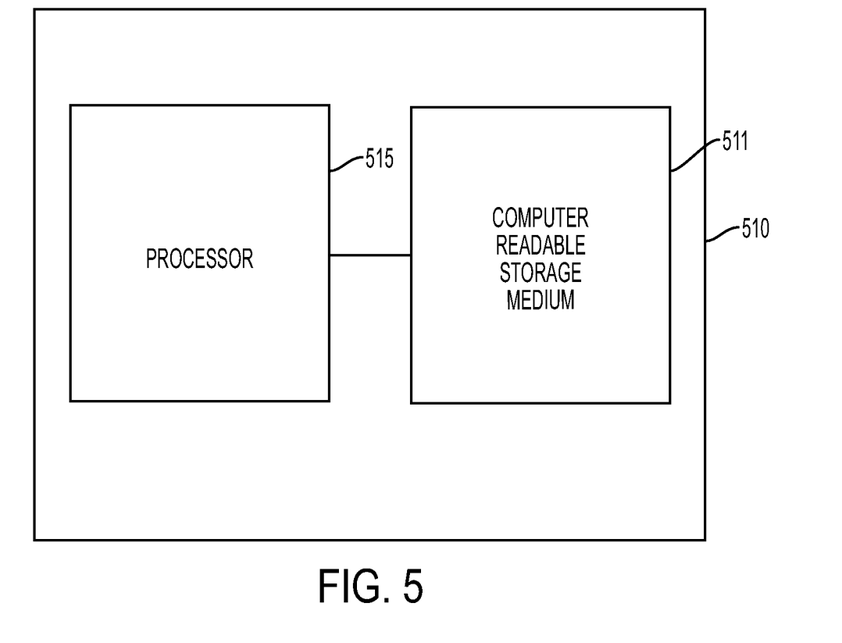
FIG. 5 is a schematic drawing illustrating an exemplary computer system for circuit designs.

FIG. 5 is a schematic drawing illustrating an exemplary computer system for circuit designs. In FIG. 5, a computer system 510 can include a computer-readable storage medium 511 that is electrically coupled with a processor 515.

In some embodiments, the computer-readable storage medium 511 can be configured to store a file corresponding to at least one of a portion of a first metallic layer and a portion of a second metallic layer of an integrated circuit that is covered by at least one dummy layer. The second metallic layer is disposed over the first metallic layer. The first metallic layer, the second metallic layer and a gate electrode of the integrated circuit can have a same routing direction. For example, the computer-readable storage medium 511 can be configured to store the file corresponding to at least one of portions of the metallic layers of the integrated circuit 200 that is covered by at least one dummy layer as described above in conjunction with FIGS. 1-4.

In some embodiments, the computer-readable storage medium 511 can be an electronic, magnetic, optical, electromagnetic, infrared, a semiconductor system (or apparatus or device), and/or a propagation medium. For example, the computer readable storage medium 511 can include a semiconductor or solid-state memory, a magnetic tape, a removable computer diskette, a random access memory (RAM), a read-only memory (ROM), a rigid magnetic disk, and/or an optical disk. In some embodiments using optical disks, the computer-readable storage medium 511 can include a compact disk-read only memory (CD-ROM), a compact disk-read/write (CD-R/W), and/or a digital video disc (DVD).

In some embodiments, the processor 515 can be configured to perform a logic operation to the file so as to size at least one of the portion of the first metallic layer and the portion of the second metallic layer. For example, the processor 515 can perform a logic operation to the layout database or GDS file described above in conjunction with FIGS. 3 and 4. In some embodiments, the processor 515 can be encoded with a computer program code. The processor 515 can be configured to execute the computer program code for designing integrated circuits. The processor 515 can be a central processing unit (CPU), a multi-processor, a distributed processing system, and/or any suitable processing unit.

In some embodiments, the processor 515 can be configured to perform a logic operation to a layout database of the file. After the logic operation, the process is configured to further convert the logically-operated layout database to a GDS file. In other embodiments, before the logic operation the processor 515 can be configured further to convert a layout database of the file to a GDS file. The processor 515 is then configured to perform the logical operation to the GDS file of the file to generate a logically-operated GDS file. In some embodiments, the logic operation and the conversion step can be performed by VIRTUOSO® Layout Editor, or VIRTUOSO® XL-Layout Editor commercially available from Cadence Design Systems of San Jose, Calif. U.S.A., or LAKER™ commercially available from Springsoft Inc. of Taiwan.

In a first exemplary embodiment of this application, a method of designing an integrated circuit includes defining at least one dummy layer covering at least one of a portion of a first metallic layer and a portion of a second metallic layer of an integrated circuit. The second metallic layer is disposed over the first metallic layer. The first metallic layer, the second metallic layer and a gate electrode of the integrated circuit have a same routing direction. A logical operation is performed to a file corresponding to the at least one of the portion of the first metallic layer and the portion of the second metallic layer covered by the dummy layer so as to size at least one of the portion of the first metallic layer and the portion of the second metallic layer.

In a second exemplary embodiment of this application, a computer system includes a computer-readable storage medium electrically coupled with a processor. The computer-readable storage medium is configured to store a file corresponding to at least one of a portion of a first metallic layer and a portion of a second metallic layer of an integrated circuit that is covered by at least one dummy layer. The second metallic layer is disposed over the first metallic layer. The first metallic layer, the second metallic layer and a gate electrode of the integrated circuit have a same routing direction. The processor is configured to perform a logic operation to the file so as to size at least one of the portion of the first metallic layer and the portion of the second metallic layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of designing an integrated circuit, the method comprising:
    defining at least one dummy layer covering at least one of a portion of a first metallic layer and a portion of a second metallic layer of an integrated circuit, the second metallic layer being disposed over the first metallic layer, the first metallic layer, the second metallic layer and a gate electrode of the integrated circuit having a same routing direction; and
    performing a logical operation, using a processor, to a file corresponding to the at least one of the portion of the first metallic layer and the portion of the second metallic layer covered by the dummy layer so as to size at least one of the portion of the first metallic layer and the portion of the second metallic layer.

2. The method of claim 1, wherein the at least one dummy layer covers both the portion of the first metallic layer and the portion of the second metallic layer.

3. The method of claim 1, wherein the at least one dummy layer further covers at least one of a portion of the gate electrode and a portion of a diffusion area of the integrated circuit.

4. The method of claim 1, wherein the at least one dummy layer covers at least one of a macro and a standard cell array of the integrated circuit, and the at least one of the macro and the standard cell array includes the at least one of the portion of the first metallic layer and the portion of the second metallic layer.

5. The method of claim 1, wherein the performing the logical operation to a file includes performing the logical operation to a layout database of the file to generate a logically-operated layout database, and the method further comprising:
converting the logically-operated layout database to a graphic data system (GDS) file after the logical operation.

6. The method of claim 1, further comprising:
before performing the logical operation, converting a layout database of the file to a graphic data system (GDS) file, wherein the performing a logical operation to a file includes performing the logical operation to the GDS file of the file to generate a logically-operated GDS file.

7. The method of claim 1, wherein the integrated circuit comprises:
a first diffusion region for a first type transistor, the first type transistor including a first source/drain (S/D) region in the first diffusion region;
a second diffusion region for a second type transistor, the second diffusion region being separated from the first diffusion region, the second type transistor including a second S/D region in the second diffusion region;
the gate electrode continuously extending across the first diffusion region and the second diffusion region in the same routing direction;
the first metallic layer electrically coupled with the first S/D region; and
the second metallic layer electrically coupled with the first metallic layer, wherein the first metallic layer is wider than the second metallic layer.

8. The method of claim 1, wherein a first dummy layer of the at least one dummy layer covers the portion of the first metallic layer and a second dummy layer of the at least one dummy layer covers the portion of the second metallic layer.

9. A method of designing an integrated circuit, the method comprising:
defining at least one dummy layer covering at least a portion of a first metallic layer, at least a portion of a second metallic layer, at least a portion of a gate electrode and at least a portion of a diffusion area of an integrated circuit, wherein the second metallic layer is disposed over the first metallic layer, and the first metallic layer, the second metallic layer and the gate electrode of the integrated circuit having a same routing direction; and
performing a logical operation, using a processor, to a file corresponding to the portion of the first metallic layer, the portion of the second metallic layer, the portion of the gate electrode and the portion of the diffusion area of the integrated circuit so as to size at least one of the portion of the first metallic layer and the portion of the second metallic layer to adjust a resistance-capacitance (RC) time delay of the integrated circuit.

10. The method of claim 9, wherein the at least one dummy layer covers at least one of a macro and a standard cell array of the integrated circuit, and the at least one of the macro and the standard cell array includes the portion of the first metallic layer, the portion of the second metallic layer, the portion of the gate electrode and the portion of the diffusion area.

11. The method of claim 9, wherein the performing the logical operation to a file includes performing the logical operation to a layout database of the file to generate a logically-operated layout database, and the method further comprising:
converting the logically-operated layout database to a graphic data system (GDS) file after the logical operation.

12. The method of claim 9, further comprising:
before performing the logical operation, converting a layout database of the file to a graphic data system (GDS) file, wherein the performing the logical operation to a file includes performing the logical operation to the GDS file of the file to generate a logically-operated GDS file.

13. The method of claim 9, wherein the integrated circuit comprises:
a first diffusion region of the diffusion area for a first type transistor, the first type transistor including a first source/drain (S/D) region in the first diffusion region;
a second diffusion region of the diffusion area for a second type transistor, the second diffusion region being separated from the first diffusion region, the second type transistor including a second S/D region in the second diffusion region;
the gate electrode continuously extending across the first diffusion region and the second diffusion region in the routing direction;
the first metallic layer electrically coupled with the first S/D region; and
the second metallic layer electrically coupled with the first metallic layer, wherein the first metallic layer is wider than the second metallic layer.

14. A computer system comprising:
a non-transitory computer-readable storage medium being configured to store a file corresponding to at least one of a portion of a first metallic layer and a portion of a second metallic layer of an integrated circuit that is covered by at least one dummy layer, wherein the second metallic layer is disposed over the first metallic layer, and the first metallic layer, the second metallic layer and a gate electrode of the integrated circuit have a same routing direction; and
a processor electrically coupled with the non-transitory computer-readable storage medium, the processor being configured to perform a logical operation to the file so as to size at least one of the portion of the first metallic layer and the portion of the second metallic layer.

15. The computer system of claim 14, wherein the at least one dummy layer covers both the portion of the first metallic layer and the portion of the second metallic layer.

16. The computer system of claim 15, wherein the at least one dummy layer further covers at least one of a portion of the gate electrode and a portion of a diffusion area of the integrated circuit.

17. The computer system of claim 14, wherein the at least one dummy layer covers at least one of a macro, a micro, a building block and a standard cell array of the integrated circuit, and the at least one of the macro, the micro, the building block and the standard cell array includes the at least one of the portion of the first metallic layer and the portion of the second metallic layer.

18. The computer system of claim 14, wherein the file includes a layout database and, after performing the logical operation, the processor is configured to further convert the logically-operated layout database to a graphic data system (GDS) file.

19. The computer system of claim 14, wherein before performing the logical operation, the processor is configured further to convert a layout database of the file to a graphic data system (GDS) file, and the processor is configured to perform the logical operation to the GDS file of the file to generate a logically-operated GDS file.

20. The computer system of claim 14, wherein the integrated circuit comprises:
- a first diffusion region for a first type transistor, the first type transistor including a first source/drain (S/D) region in the first diffusion region;
- a second diffusion region for a second type transistor, the second diffusion region being spaced from the first diffusion region, the second type transistor including a second S/D region in the second diffusion region;
- the gate electrode continuously extending across the first diffusion region and the second diffusion region in the routing direction;
- the first metallic layer electrically coupled with the first S/D region; and
- the second metallic layer electrically coupled with the first metallic layer, wherein the first metallic layer is wider than the second metallic layer.

* * * * *